2,987,473
FRACTIONATION OF CLAYS
Nathan Millman and James Brooks Whitley, Macon, Ga., assignors to J. M. Huber Corporation, Borger, Tex., a corporation of New Jersey
No Drawing. Filed Dec. 1, 1955, Ser. No. 550,494
8 Claims. (Cl. 210—57)

This invention relates to production of clay products adapted for use as fluid slips, and more particularly to the production of kaolin type clay products, and to their fractionation.

Suspensions of clays, and particularly kaolin clays, are well known in the art. Kaolin slips containing from 30 to 60 percent by weight of kaolin can be brought into suspensions of only a few centipoises viscosity by means of such deflocculating agents as sodium silicate, sodium pyrophosphate, gum arabic and other well known substances. The sand, mica and other coarse material settle rapidly from such suspensions, and can be removed from the remaining suspension of fine particles. This constitutes what is known in the art as a degritted slip.

It is common practice to separate degritted slips into fractions in which the particles of kaolin are graded according to size. One common method of separation is to permit the slip to settle in large tanks. Slips containing 30 to 45% kaolin in deflocculated condition may be settled in tanks 20 to 40 feet in diameter and from 10 to 15 feet deep. After settling for 24 hours or longer a certain amount of slip containing about 80% of the kaolin in the form of particles, 2 microns or less in size, can be withdrawn from the top. A solid layer in the bottom of the tank will contain particles most of which are larger than 5 microns, and the remaining liquid suspension will contain kaolin largely intermediate in size. Other methods for fractionating degritted slips have been developed using mechanical settling devices, such as classifiers and centrifuges. However, such methods as previously employed require long periods of time to effect satisfactory separation and their utilization under optimum conditions often results in a product not sufficiently fractionated for many purposes.

Accordingly it is a principal object of the present invention to provide an improved rapid process for producing suitably fractionated clays and more particularly kaolin clays.

Another object of this invention is to provide a process of improved efficiency for fractionating clay to produce clay slips comprising suspensions of kaolin particles of desired sizes in aqueous media.

Other objects of the invention will in part be obvious and will in part appear hereinafter.

The separation of kaolin in which 90% or more is of a size below two microns, or in which 85% are below one micron requires very long periods of settling, and is not always completely successful. If the particles of kaolin are considered to have an equivalent spherical diameter, the distance settled in unit time is directly proportional to the square of the diameter and inversely proportional to the viscosity of the suspension. This can be expressed by the equation $$L = \frac{D^2}{V}$$

where L is the distance settled in unit time, D is the diameter of the particle and V is the viscosity of the suspension. In practice it has been found that the rate of settling to produce a clay 90% of the particles of which are less than 2 microns from a 35% kaolin slip is only a few centimeters per hour, and the results are difficult to duplicate from day to day. It is obvious from an examination of the equation that the rate of settling can be increased by reducing the viscosity.

While the viscosity of water decreases with increase in temperature, the viscosity of a suspension of kaolin in water increases. For example, the viscosity of a 30% kaolin slip which measures 381 centipoises at 25° C. increases to 523 centipoises at 60° C. The viscosity of clay slips can be greatly reduced by the addition of a deflocculent. For example, 0.15% of sodium pyrophosphate by weight of the kaolin reduces the viscosity of this slip at 25° C. from 381 centipoises to 18.1 centipoises.

Surprisingly, we have found, contrary to the effect noted on slips not containing deflocculating agents, that heating a deflocculated kaolin slip further reduces the viscosity. Thus, heating the above deflocculated slip to 60° C. reduces the viscosity to 13.6 centipoises, or 75% of the value at 25° C. Although this might appear to indicate that an increased rate of settling of a deflocculated slip should be obtained at elevated temperatures, it was found, to the contrary, that increasing the temperature of a deflocculated slip to 56° C., while reducing the viscosity of the slip, did not increase the rate of gravity settling and effective separation of a fraction below two microns could not be achieved. The result was the same whether the slip was introduced into the tank in a heated condition or the heat was applied to the slip in the tank by means of heated coils or raw steam and it is believed that convective current interfered with the settling which might have otherwise taken place.

We have now found that advantage can be taken of the decrease in viscosity in deflocculated slips at elevated temperatures by maintaining a rate of sedimentation sufficient to overcome the convective motion in the liquid. This can be achieved by providing a gravitational force greater than three hundred times gravity. Further by adjusting the gravitational force used, even greater selectiveness as to particle size along with increased efficiency can be enjoyed.

Accordingly, the present invention comprises subjecting a deflocculent-containing aqueous suspension of clay of varying particle size at an elevated temperature to a sedimentary force of at least three hundred times the force of gravity to effect separation of the clay into fractions of predetermined particle size. Preferably the temperature is on the order of between 40° C. and the temperature at which the suspension boils and more particularly between 45° C. and 80° C. to insure one fraction, the particle size of which is 2 microns or less in diameter. The deflocculent used may be any of those which are commonly used, such as sodium pyrophosphate, sodium hexametaphosphate, and other alkali polyphosphates, sodium silicate, sodium carbonate, caustic soda, ammonia and gum arabic. Sedimentary force is preferably provided by using classifiers of the centrifuge type. The centrifuges may be of a batch type in which a given amount of material is treated for a definite length of time and at a predetermined force. A second type centrifuge which can be used is the type designed to receive a continuous flow of suspension, the heavy portion of which is constantly discharged in near solid form, while the more finely divided portion is discharged in liquid form.

In practicing the present invention any method can be used to provide the deflocculent-containing aqueous suspension of clay. One method comprises admixing pulverulent kaolin, with a defluocculent in an aqueous medium. The suspension may then be heated to the desired temperature and maintained within the temperature range 40°–80° C. while subjecting it to a suitable controlled sedimentary force.

Example 1

This example is included to show the disadvantageous effect of increased temperature on fractionation under gravity settling conditions. A 35% kaolin slip containing no particles larger than 44 microns was deflocculated with 0.15% of sodium hexametaphosphate on the weight of the clay. Portions of this slip were settled for one hour in tanks 3 feet in diameter and 3 feet deep, from which the top 10 inches were removed for examination. In one case the settling took place at 27° C., and in the other the settling started at 70° C. and finished at about 66° C. A particle size analysis was made by means of a hydrometer to determine the percent by weight in different size ranges.

|  | Settled at 27° C. | Settled at 70° C. |
| --- | --- | --- |
| Percent less than 10 microns | 93 | 88.5 |
| Percent less than 5 microns | 69 | 65 |
| Percent less than 3 microns | 58.5 | 55 |
| Percent less than 2 microns | 46 | 43.5 |

From these data it is seen that increased temperature of deflocculated slip adversely affects fractionation by gravity settling.

Example 2

For use in this experiment a previously degritted clay was made to contain 30 pounds of clay in 100 pounds of the suspension in the absence of a deflocculating agent. A portion of this slip was placed in cups in a centrifuge at 25° C. and centrifuged at a force of 300 times gravity. After ten minutes the product had settled to produce half its volume of clear liquid on top, all of the kaolin having settled together to produce a dewatered effect, but without fractionation. The experiment was repeated at 60° C. At this temperature the same type of dewatering was obtained in about the same time. It may thus be seen that sedimentation of a slip not containing a deflocculent produces no substantial fractionation regardless of the sedimentary force exerted.

Example 3

The same degritted clay suspension used in Example 2 was deflocculated by the addition of 0.2% of sodium hexametaphosphate by weight of the clay and then centrifuged at 300 times gravity, and 30° C. After ten minutes the contents of the cups consisted of a solid cake in the bottom with a suspension of clay above. The suspended portion was examined under an electron microscope and revealed that the particles were substantially all less than 1 micron in size. The cake portion was dried and weighed. The dry cake represented 53% by weight of the total clay. After five minutes the amount of clay suspended in the liquid had been determined as being about 67% of the total clay, and only 47% of the suspended particles had diameters less than 1 micron. There was thus inadequate fractionation under the conditions of this experiment when centrifugation for five minutes at 25° C. and under such conditions centrifugation for ten minutes was required to provide effective fractionation.

The above experiment was repeated at 60° C. and after only 5 minutes the suspended clay particles were all substantially less than 1 micron in size.

Example 4

An experiment was conducted using a Sharples Super-D-Canter continuous centrifuge. This apparatus continuously discharges the large particles as a heavy mud, and discharges the fine particles in liquid suspension. The clay used was a degritted suspension, 80% of the clay solids being particles under two microns in size. The suspension contained 34.2% of clay solids, and was defluocculated with 0.2% of sodium polyphosphate by weight of the clay. The centrifuge was operated at a speed to produce a force equal to 500 times gravity, and the slip was passed through the centrifuge at 25° C. at a rate of 300 gallons per hour. The liquid effluent contained kaolin, 82% of which was finer than 2 microns. The experiment was then repeated at 70° C. and the effluent contained kaolin, 91% of which was finer than two microns.

Example 5

The deflocculated and degritted slip of Example 3 was used for this experiment and the centrifuge was operated to produce a force of 2000 times gravity. The slip was passed through the centrifuge producing an effluent containing kaolin having a particle size 97% of which was finer than two microns. The following table shows the yield of such clay in pounds per hour which was obtained at different temperatures.

| Temp., ° C. | Production rate, pounds per hour |
| --- | --- |
| 25 | 400 |
| 35 | 560 |
| 40 | 650 |
| 50 | 2400 |
| 65 | 2640 |
| 80 | 2900 |

While the ease of separation and rate of production increase with the first increase in temperature the important benefit begins only after a considerable increase in temperature. The exact temperature above which an increased temperature becomes economically important depends somewhat on the type and fineness of the kaolin, but generally lies between about 40° C. and 80° C.

Having described the invention which is the subject of the present application, and having cited illustrative examples showing its operations, what we claim as new and desire to secure by Letters Patent is:

1. A process for fractionating clay of varying particle size which comprises, subjecting a deflocculent-containing aqueous suspension of said clay at a temperature substantially above room temperature but below the boiling point of said aqueous suspension to a sedimentation force of at least three hundred times the force of gravity to effect separation of said suspension into aqueous fractions of different particle size.

2. A process for fractionating into aqueous fractions an aqueous suspension of clay containing a substantial number of clay particles having particle sizes of 2 microns or less which comprises subjecting a suspension of clay in aqueous medium containing a deflocculent to a controlled sedimentation force of at least three hundred times the force of gravity at a temperature between about 40° and 80° C. and recovering at least the fraction comprising predominately 2 microns or less.

3. A process for producing an aqueous suspension product of kaolin comprising a substantial number of kaolin particles of predetermined particle size, said process comprising the steps of contacting kaolin with a deflocculent in the presence of an aqueous medium to form a suspension of kaolin particles, heating the suspension to a temperature between about 45° C. and 80° C. and subjecting the suspension within said temperature range to a controlled sedimentation force of at least three hundred times the force of gravity thereby precipitating from the suspension substantially all particles having diameters greater than the predetermined size.

4. A process for producing an aqueous suspension product of kaolin comprising a substantial number of kaolin particles having particle sizes of 2 microns or less, the process comprising subjecting a suspension of clay particles in aqueous medium containing a deflocculent to a controlled sedimentation force of at least three hundred times the force of gravity while maintaining the suspension at a temperature between 40° C. and the temperature at which the suspension boils, thereby precipitating from the suspension substantially all particles having diameters greater than the predetermined size.

5. A process for producing fluid slips containing kaolin particles of a predetermined size, on the order 2 microns or less, which comprises providing an aqueous suspension of kaolin particles in the presence of a deflocculating agent, maintaining the suspension at a temperature in excess of 45° C. while subjecting the suspension to a controlled sedimentation force of at least three hundred times the force of gravity to separate out from the suspension substantially all of the kaolin particles having a diameter greater than 2 microns.

6. A process for producing an aqueous kaolin suspension having particles of a predetermined size 2 microns or less, the process which comprises admixing pulverulent kaolin of varying particle size with a deflocculent in an aqueous medium to substantially form a suspension thereof, maintaining the suspension at a temperature above about 40° C. while subjecting the suspension to controlled centrifugation under a force of at least three hundred time gravity to precipitate from the suspension substantially all of the particles of kaolin having diameters greater than the predetermined size of 2 microns.

7. A process for fractionating kaolin clay of varying particle size to produce a fluid slip having substantially all particles of a predetermined diameter 2 microns or less, the process which comprises admixing pulverulent kaolin and a deflocculent selected from the group consisting of sodium pyrophosphate, sodium hexametaphosphate, alkali polyphosphates, sodium silicate, sodium carbonate, caustic soda, ammonia and gum arabic in an aqueous medium to form a deflocculated suspension of kaolin, heating the suspension to a temperature on the order of between 40° C. and 80° C., and maintaining said temperature while subjecting the suspension to a centrifugation under a force of three hundred times gravity or greater to effect separation into fractions of different particle size, one of said fractions being aqueous and comprising suspended particles 2 microns or less in an aqueous medium.

8. A process for fractionating kaolin clay of varying particle size to produce a fluid slip having substantially all particles of a predetermined diameter 2 microns or less, the process which comprises admixing pulverulent kaolin and a deflocculent selected from the group consisting of sodium pyrophosphate, sodium hexametaphosphate, alkali polyphosphates, sodium silicate, sodium carbonate, caustic soda, ammonia and gum arabic in an aqueous medium to form a deflocculated suspension of kaolin, heating the suspension to a temperature between 40° C. and the temperature at which the suspension boils, and maintaining said temperature while subjecting the suspension to a centrifugating force of three hundred times gravity or greater to effect separation into fractions of different particle size, one of said fractions being aqueous and comprising suspended particles 2 microns or less in an aqueous medium.

References Cited in the file of this patent
UNITED STATES PATENTS

| | | |
|---|---|---|
| 1,940,753 | Howard | Dec. 26, 1933 |
| 2,158,987 | Maloney | May 16, 1939 |
| 2,235,955 | Williams | Mar. 25, 1941 |
| 2,345,827 | Olin | Apr. 4, 1944 |
| 2,393,560 | Partridge | Jan. 22, 1946 |
| 2,535,647 | Millman et al. | Dec. 26, 1950 |
| 2,685,569 | Crossley | Aug. 3, 1954 |

OTHER REFERENCES

"Separation by Centrifugal Force," Ayres, 1942, Sharples Corporation Publication No. 1226–3M–6.42, pages 1 and 2.